Patented Mar. 13, 1951

2,544,909

UNITED STATES PATENT OFFICE 2,544,909

METHOD FOR DEAERATING INDIGO PASTE

Walter Herbert Wright, Wilmington, Del., assignor to E. I. du Pont de Nemours & Company, Wilmington, Del., a corporation of Delaware No Drawing. Application May 25, 1949,
Serial No. 95,371

6 Claims. (Cl. 8—38)

This invention relates to a process for preparing indigo dyestuff, and is particularly concerned with a method for processing indigo paste to produce an essentially air-free indigo paste.

In the manufacture of indigo, mixed sodium and potassium phenyl glycines are fused with anhydrous sodium and potassium hydroxides and sodium amide to form indoxyl. The indoxyl is oxidized to indigo by blowing air through an aqueous solution of alkali metal indoxyl. A slurry of precipitated indigo results, from which the indigo is recovered in the form of a paste by filtration. Dry indigo powder may be prepared from the paste, but it is usually more economical for the dyer to use the paste, and paste also has the advantage of being non-dusting. The paste is commonly marketed with a 20% indigo content.

A difficulty is encountered with indigo paste prepared in the above manner which has troubled the industry for many years. The formation and precipitation of indigo particles in the presence of air results in occlusion of air in the particles. The occluded air is not removed during the usual processing steps of filtering the alkaline indigo slurry and washing the resulting filter cake. Air remains in the indigo particles until released during reduction in preparing the dye vat, at which time the release of air causes objectionable frothing and foaming. This foam interferes, for example, with measurement of the charge and accumulates with successive charges to cause overflowing. The occluded air also makes the paste viscous, so that it is difficult to process in manufacturing operations and difficult to handle in use.

It has been found to be impossible to remove the air by means of reduced pressure alone. When indigo paste, without the addition of special agents, is placed in a closed container and the container evacuated, air bubbles in the paste expand until the volume of paste is greatly increased. However, the bubbles do not break and return to their original size when the paste is again exposed to atmospheric pressure.

One well-known method of removing occluded air is to make a dilute slurry of the filter cake in water, acidify the slurry, then refilter to recover the indigo as a paste, and rewash. This operation, while producing an air-free paste, requires an expensive installation of tanks and filter presses, and adds considerably to the cost of the products. Furthermore, a problem remains of avoiding the reintroduction of air during subsequent processing.

In preparing indigo paste for commercial use, the paste obtained by filtration is standardized to the desired commercial strength by adding water. The paste and the required amount of water are placed in a mixer and agitated until a homogeneous product is obtained. This paste is viscous, which causes difficulty in mixing and makes it difficult to avoid beating air into the paste. The presence of air makes the paste more viscous and causes foaming troubles during mixing as well as in subsequent use.

Various materials may be added to thin the paste and thereby facilitate mixing and help prevent introduction of air during mixing. Among these may be mentioned dispersing agents, such as sodium alkyl sulfonates, and gums, glues, casein and dextrin. While these assist in the processing of indigo paste, they do not relieve foaming in customer's dyeing and washing vats. In fact, sodium alkyl sulfonates are foaming agents themselves and aggravate the latter difficulty. Dispersing agents which would not themselves cause foaming in the vats were tried but these did not cause air to escape from the paste. Froth arose but did not break.

Other deficiencies of ordinary indigo paste include that of settling to become non-homogeneous, and that of 20% indigo paste being so viscous that it does not readily pour out of a drum.

Accordingly it is an object of the present invention to provide a process for removing air from indigo paste to produce a non-frothing paste which may be processed readily without reintroducing air. A further object of the invention is to provide a process for preparing essentially air-free indigo paste which is non-settling and free-pouring. Other objects and advantages of the invention will become apparent from the following description and claims.

The above objects of the invention are accomplished by a process which comprises the following steps: The paste obtained by filtering an aqueous slurry of indigo, containing air bubbles introduced during air-oxidation of the indoxyl, is mixed with most of the water required for dilution to the desired final strength, and thinned with a small amount of a non-foam-producing dispersing agent. The thinned paste or slurry is agitated in a vacuum system and preferably circulated in such a way that relatively thin moving films of the paste are exposed to a reduced absolute pressure of not over 50 mm. of mercury until the air bubbles are broken and essentially all of the air has been removed from the paste. The specific gravity of a given concentration of paste is a measure of the amount of air present. A 20% indigo paste prepared from untreated indigo filter cake will have a specific gravity of only about 0.8 to 0.9 due to the presence of air. After removal of the air the specific gravity of a 20% paste will be about 1.07. The deaerated slurry is then removed from the vacuum system and mixed with the additional water necessary to bring the paste to the desired final strength and an amount of phosphoric acid which will provide an excess of 0.1% to 0.5% by weight, based on the weight of the paste, over the amount necessary to neutralize the alkalinity of the paste.

Non-foaming dispersing agents which may be used include a water-soluble salt of a formaldehyde condensation product of naphthalene-β-sulfonic acid, such as the product marketed as "Daxad 11," and a water-soluble salt of lignin sulfonic acid, a by-product obtained in the production of paper pulp by the sulfite process. The amount of dispersing agent used will preferably be in the range of about 0.5% to 5.0%, based on the weight of indigo in the paste, depending upon the batch of indigo paste. Enough dispersing agent should be used to provide sufficient thinning for satisfactory air removal, but if too much is used it will be found that the deaerated paste cannot be standardized satisfactorily.

Agitation and a low pressure of not over 50 mm. of mercury absolute pressure have been found necessary for satisfactory removal of air. Air removal will be best accomplished by arranging for exposure of the paste to the reduced pressure in a moving thin film of relatively large area. For this purpose it is desirable to use a vacuum system which provides for tangential discharge of the thinned paste at the top of an evacuated chamber, arranged so that the paste is spread out and flows down the inner surface of the chamber wall in a moving thin film. Paste should be continuously pumped from the bottom of the chamber and discharged at the top until essentially all of the air is removed.

The purpose of adding phosphoric acid to the deaerated paste is to thicken the paste sufficiently to be non-settling so that the paste will remain homogeneous. However, too much phosphoric acid will make the paste too thick to be free-flowing. The correct amount will be an amount sufficient to neutralize the paste plus an excess of 0.1% to 0.5% by weight, based on the weight of the paste. Within these limits the optimum degree of paste thickness, to provide a paste which best combines the properties of being free-flowing and non-settling, is readily determined by one who is skilled in the art of dyestuff manufacture. The combination of properties is achieved, from the starting material described, when and only when all three of the factors of removal of occluded air, use of the proper dispersing agent, and use of a thickening agent such as phosphoric acid are recognized and adequately treated.

The practice of the invention is illustrated by the following specific example, but it is understood that changes may be made therein without departing from the scope of the invention as defined in the appended claims:

An alkaline-water solution of indoxyl, prepared as described in Example 1 of United States Patent No. 2,020,387, issued November 12, 1935 to W. R. Waldron, was oxidized by passing air through the solution with agitation. The indigo formed was recovered as a paste and adjusted to an indigo content of 20%. About 1800 pounds of the 20% indigo paste, which contained air and had a specific gravity of 0.91, was thinned by incorporating "Daxad 11" in the amount of 0.25% of the weight of paste. Partial removal of air occurred during thinning, as shown by a rise in specific gravity to 0.977. The thinned paste or slurry was pumped into a cylindrical separator resembling a cyclone separator where it was subjected to an absolute pressure of 25 to 50 mm. of mercury. The slurry was circulated by means of a pump which discharged the slurry at the top of the separator in such a manner that tangential film flow down the wall was obtained. After one hour of circulation the specific gravity of the slurry had risen from 0.977 to 1.067, indicating that essentially all of the air had been removed. The slurry was then thickened by adding enough phosphoric acid to neutralize the slurry and provide an excess of 0.3%.

By the present invention a process is provided for removing air from indigo paste to produce a product which does not cause froth or foam when used in vat dyeing operations, including the operation of reducing to leucoindigo in preparing dye baths. In addition to being free from air, the paste remains homogeneous during shipment and storage and pours readily as a 20% paste. The process therefore provides means of overcoming important difficulties which have troubled the art for many years.

As different embodiments of this invention may be made without departing from the spirit and scope thereof it is to be understood that the invention is not limited to the specific embodiments disclosed except as defined in the appended claims.

In accordance with the above description the following is claimed as my new and useful invention:

1. A process for removing air from indigo paste which comprises thinning an indigo paste which contains occluded air with a small amount of a non-foaming dispersing agent and then subjecting the thinned paste to a reduced absolute pressure of not over 50 mm. of mercury in the form of a moving film until essentially all of the air is removed from the paste.

2. A process for removing air from indigo paste which comprises thinning an indigo paste which contains occluded air with about 0.5% to 5.0% based on the weight of indigo in the paste of a non-foaming dispersing agent and subjecting the thinned paste to a reduced absolute pressure of not over 50 mm. of mercury in the form of a moving film until essentially all of the air is removed from the paste.

3. A process for removing air from indigo paste which comprises thinning an indigo paste which contains occluded air with about 0.5% to 5.0% based on the weight of indigo in the paste of a non-foaming dispersing agent, and subjecting the thinned paste to a reduced absolute pressure of not over 50 mm. of mercury in the form of a moving film until essentially all of the air is removed from the paste, and then thickening the paste with an amount of phosphoric acid which provides an excess of 0.1% to 0.5% based on the weight of the paste over the amount necessary to neutralize the paste.

4. A process for removing air from indigo paste which comprises thinning an indigo paste which contains occluded air with about 0.5% to 5.0% based on the weight of indigo in the paste of a water-soluble salt of a formaldehyde condensation product of naphthalene-β-sulfonic acid and then subjecting the thinned paste to a reduced absolute pressure of not over 50 mm. of mercury in the form of a moving film until essentially all of the air is removed from the paste.

5. A process for removing air from indigo paste which comprises thinning an indigo paste which contains occluded air with about 0.5% to 5.0% based on the weight of indigo in the paste of a water-soluble salt of lignin sulfonic acid and then subjecting the thinned paste to a reduced absolute pressure of not over 50 mm. of mercury in the form of a moving film until essentially all of the air is removed from the paste.

6. A process for preparing a standard strength non-frothing indigo paste which is non-settling and free-pouring comprising the steps of preparing an aqueous indigo paste of not less than the desired standard strength which contains occluded air introduced during the manufacture, thinning the paste with about 0.5% to 5.0% based on the weight of indigo in the paste of a non-foaming dispersing agent, subjecting the thinned paste to a reduced absolute pressure of not over 50 mm. of mercury in the form of a moving film until essentially all of the air is removed from the paste, and then mixing the paste with the required amount of water and with an amount of phosphoric acid which provides an excess of 0.1% to 0.5% based on the weight of the paste over the amount necessary to neutralize the paste.

WALTER HERBERT WRIGHT.

REFERENCES CITED

The following references are of record in the file of this patent:

UNITED STATES PATENTS

| Number | Name | Date |
| --- | --- | --- |
| 1,999,147 | Ambrose | Apr. 23, 1935 |
| 2,306,265 | Heald | Dec. 22, 1942 |